United States Patent [19]

Maucher et al.

[11] 4,420,070

[45] Dec. 13, 1983

[54] FRICTION CLUTCH UNIT

[75] Inventors: Paul Maucher, Sasbach; Oswald Friedman, Lichtenau, both of Fed. Rep. of Germany

[73] Assignee: Luk Lamellen und Kupplungsbau GmbH, Bühl, Fed. Rep. of Germany

[21] Appl. No.: 353,873

[22] Filed: Mar. 2, 1982

Related U.S. Application Data

[63] Continuation of Ser. No. 143,559, Apr. 25, 1980, abandoned.

[30] Foreign Application Priority Data

Apr. 27, 1979 [DE] Fed. Rep. of Germany ....... 2917138

[51] Int. Cl.$^3$ .......................... F02N 5/04; F16D 21/06; F16D 13/44
[52] U.S. Cl. .................................... 192/48.8; 74/7 C; 74/572; 123/179 J; 192/89 B; 192/96
[58] Field of Search ..................... 192/48.8, 89 B, 96; 74/7 C, 572; 123/179 J; 290/38 B; 180/165

[56] References Cited

U.S. PATENT DOCUMENTS

| 1,847,784 | 3/1932 | Procunier et al. | 123/179 J |
| 3,749,213 | 7/1973 | Maucher | 192/48.8 |
| 4,210,232 | 7/1980 | Bellaris | 192/89 B X |

FOREIGN PATENT DOCUMENTS 123342  2/1919  United Kingdom ............. 123/179 J

Primary Examiner—Allan D. Herrmann
Attorney, Agent, or Firm—Kontler, Grimes & Battersby

[57] ABSTRACT

An assembly for engaging and disengaging the crankshaft of an engine has a flywheel which is rotatably supported by a bearing system and is part of a first clutch. The flywheel has a second clutch for engaging and disengaging the crankshaft from the transmission shaft of a vehicle. A friction disc of the first clutch is non-rotatably connected to the crankshaft and friction linings are disposed at its opposite sides adjacent two pressure plates forming part of the flywheel and having linings cooperating with those of the friction disc. The pressure plates are axially movably but non-rotatably connected to each other and one thereof is secured to the bearing system. An operating means moves the other pressure plate axially, and a hub of the bearing system is rotatable relative to the crankshaft. A first housing part has a radially extending portion fastened to the hub, and a first diaphragm spring bears upon at least one of the pressure plates to disengage the flywheel from the crankshaft. An axially fixed pressure plate of the second clutch has axially extending arms connected to the housing part, and a friction disc of the second clutch has two linings and is fastened to the shaft. The second clutch has an axially movable pressure plate and a second housing part fastened to the axially fixed pressure plate of the second clutch. A second diaphragm spring is pivotable relative to the second housing part.

28 Claims, 1 Drawing Figure

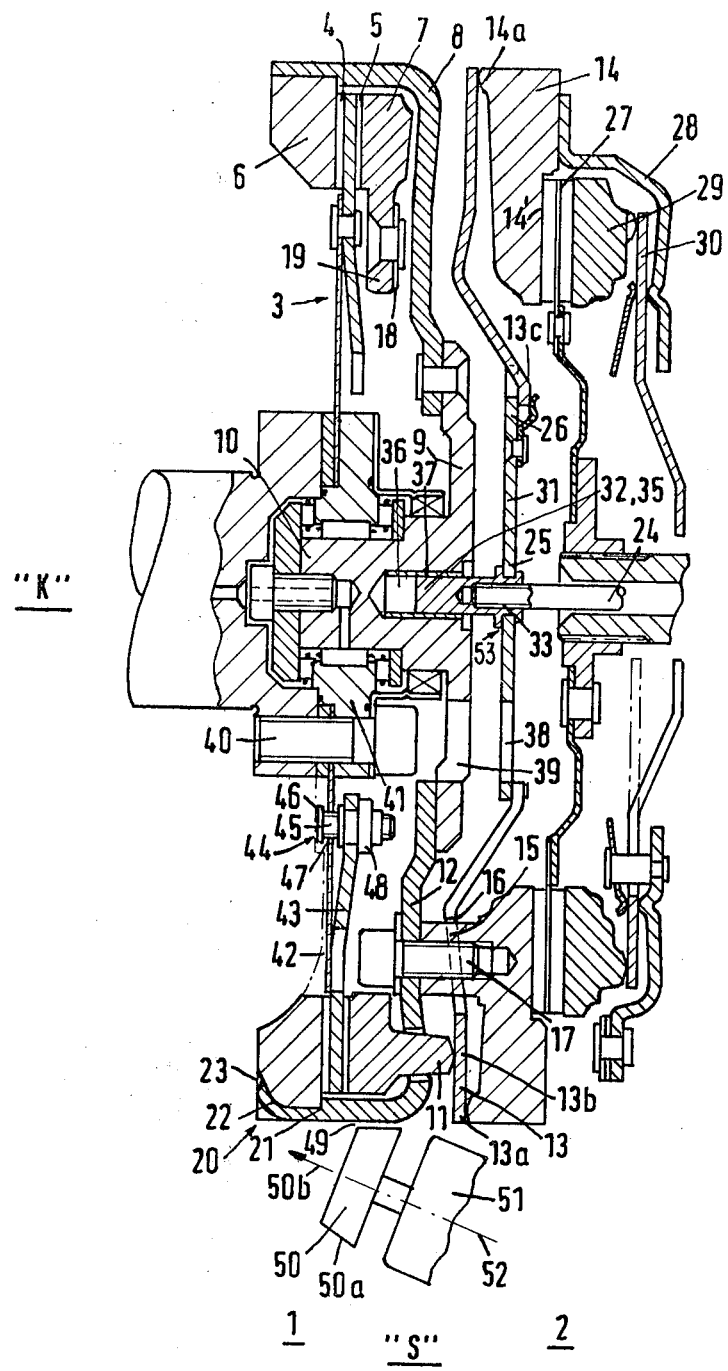

FRICTION CLUTCH UNIT

This application is a continuation, of application Ser. No. 143,559, filed Apr. 25, 1980.

Background of the Invention

The invention relates to a friction clutch assembly or unit for engaging and disengaging a flywheel body which is rotatable in a bearing system with respect to a first shaft, e.g., the crankshaft of an internal combustion engine, and at the same time forms part of a first friction clutch. The flywheel body contains a second friction clutch, expecially for engaging and disengaging a second shaft, such as the transmission shaft of a motor vehicle. In order to disengage the flywheel, a friction disc is connected to the shaft, and the flywheel body has two pressure plates, at the opposite disposed sides of the friction disc. The pressure plates have counter friction linings for the friction disc and are non-rotatably but axially movably connected to each other. One of the pressure plates is firmly connected to the bearing system against movement in the axial direction, and the other pressure plate can be acted on or moved by pressure or actuating means.

Conventional friction clutch unit of such construction has been used to operate a motor vehicle with a minimum of fuel. This is accomplished in that the connection between the internal combustion engine and the flywheel body is interrupted and the engine is stopped during those stages of operation when it does not drive the vehicle. Such conditions prevail, for instance, during pushing and idling operation as well as when the vehicle stops briefly for red lights. Meanwhile, the flywheel body continues to turn and is reengaged with the first shaft in order to start the engine when the above-mentioned operating states of the engine come to an end. The first clutch is subjected to pronounced stresses because of the high relative velocities during shifting. The second clutch is stressed, only during starting and during shifting into selected gears but also when the engine does not drive the vehicle, i.e., for instance, in pushing operation or when the engine is stopped and the flywheel body continues to rotate at such times, the connection between the first shaft and the flywheel body and, therefore, also between the engine and the drive wheels, is interrupted. Once the engine is started, the connection between the engine and the drive wheels is reestablished through the second clutch.

Objects and Summary of The Invention

It is an object of the invention to provide a friction cluth unit which overcomes the disadvantages of conventional devices of this general type and whose load-carrying capacity with respect to the coupling energy to be spent is considerably increased to make it simpler, cheaper and more reliable than the clutch unit proposed heretofore. It is further an object of the invention to provide a friction clutch unit which is readily adjustable and can be readily assembled work and, in addition, to reduce the space requirements of the friction clutch unit, as considered in the axial direction.

With the foregoing and other objects in view, there is provided, in accordance with the invention, a friction clutch assembly or unit for engaging and disengaging a first shaft, such as the crankshaft of an internal combustion engine. The assembly comprises a flywheel body which is rotatably supported in a bearing system which is part of a first clutch and which comprises a second clutch for engaging and disengaging a second shaft, such as the transmission shaft of a motor vehicle. The assembly further comprises a friction disc which serves to disengage the flywheel body and is nonrotatably connected to the first shaft, friction linings disposed at the opposite sides of the friction disc, and two pressure plates forming part of the flywheel body and each having a counter friction lining cooperating with one of the friction linings of the friction disc. The pressure plates are axially movably connected with but cannot rotate relative to each other, and one of the pressure plates is fixed to the bearing system so that it cannot move axially with respect thereto. Still further, the assembly comprises operating means for moving the other pressure plate, a hub which is integral with the bearing system and is rotatable relative to the first shaft having, a first housing part, a radially extending portion fastened to the hub, a first diaphragm spring acting upon at least one of the pressure plates to disengage the flywheel body, an axially fixed pressure plate forming part of the second clutch, axially extending arms connecting the axially fixed pressure plate of the second clutch to the radially extending portion of the first housing part to disengage the flywheel body, friction linings forming part of the second clutch and fastened to the second shaft, an axially movable pressure plate forming part of the second clutch, a second housing part fastened to the axially fixed pressure plate of the second clutch, and a second diaphragm spring for the second clutch pivotable on the second housing part. As viewed in the axial direction friction clutch, the assembly comprises the one pressure plate of the first clutch, the friction of the linings first friction disc, the other pressure plate of the first clutch, the radially extending portion of the first housing part, the first diaphragm spring, the axially fixed pressure plate of the second clutch, the friction linings of the second clutch, the axially movable pressure plate of the second clutch, and the second diaphragm spring.

Owing to such arrangement and construction, the resistance to heat and therefore the reliability of the improved assembly is increased considerably since the first diaphragm spring for the disengagement of flywheel body for the first shaft is practically exposed due to its placing between the housing part and the axially fixed pressure plate of the second clutch. This diaphragm spring can be subjected to the action of a stream of cooling air which prevents heat transfer between the two pressure plates because the individual clutches are discrete structural units which are practically separated from each other. At the same time, this facilitates the assembly and the necessary adjustment work. Since the bearing for rotatably supporting of the first clutch extends axialy from the radial portion of the first housing part and toward the crankshaft, the overall axial length is extremely small because the bearing is located in the space which is required in any event for the flywheel body or first clutch.

In accordance with another feature of the invention, the dimensions of the assembly, as considered in the axial direction, are reduced still further because the one pressure plate of the first clutch is secured to the radially extending portion of the first housing part, the first housing part forming a cage extending to the one pressure plate of the first clutch and enclosing or confining the other pressure plate and the friction linings of the first friction disc. The other pressure plate of the first clutch arms or bosses and extending in the axial direction through the radially extending portion of the first housing part, and an intermediate portion of the first diaphragm spring bears against the arms. In accordance with a further feature of the invention, the radially outermast portion of the first diaphragm spring bears against the axially fixed pressure plate of the second clutch.

In accordance wth an added feature of the invention the operating means includes an axially movable pull-rod which is coaxial with the first shaft and carries a throw-out plate disposed at the radially innermost por- Pat. No.0,073 Col. No.2 pull-rod. The first diaphragm spring can be an exclusively as a lever, and the axially movable pressure plate of the first clutch can be pressed on or lifted through the operating means. In most cases, however, it will be advantageous if the first diaphragm spring also assumes the pressing-on function for the first clutch, i.e. if it reacts against the axially fixed pressure plate of the second clutch and yieldable bears upon axially the axially movable pressure plate of the first clutch. This first clutch can be disengaged by moving the pull-rod in the axial direction against the force of the first diaphragm spring.

In accordance with an additional feature of the invention, the axially movable pressure plate of the first clutch is movable axially and away from the first friction disc, by axially yieldable but rotationally fixed spring means for connecting such pressure plate to the first housing part.

In accordance with another feature of the invention, the spring means which is yieldable in the axial direction but is fixed in the circumferential direction, such as in particular, leaf springs, further serves to transmit torque between the first housing part and the axially movable pressure plate of the first clutch. Such spring means is disposed in the space between the first housing part and the axially movable pressure plate of the first clutch. This again favors a construction that requires little room as considered in the axial direction.

As mentioned above the bearing pin which is provided support flywheel body for rotation relative to the corresponding shaft, such as the crankshaft of an internal combustion engine, is connected with the radially extending portion of the first housing part. In accordance with a further feature of the invention, such bearing includes a further part of the bearing system which also includes a radial flange integral with the hub and formed with aperture. The screws which fasten the first friction disc and the other part of the bearing system to the first shaft, are accessible by way of the apertures formed in the radial flange.

In accordance with an added feature of the invention, the throw-out plate has apertures whch are at least substantially aligned with the apertures in the radial flange. This ensures that the parts mentioned above can be pre-assembled to form a subassembly which can be bolted to the crankshaft.

As already mentioned, the first clutch can be actuated by throw-out plate which engages the innermast portion of the frst diaphragm spring. The throw-out plate is linked to the pull-rod which can extend through the hollow transmission shaft.

In accordance with an additional feature of the invention, there are provided bayonet lock means for form-locking the throw-out plate to the pull-rod against relative movement in the direction of rotation and against pull after the has been inserted into and turned relative to the throw-out plate.

In accordance with still another feature of the invention, there is provided a trunnion which is disposed centrally of the throw-out plate and has a guiding extension provided in a bore of the bearing hub to allow for axial sliding but to prevent radial movement of the throw-out plate.

In accordance with a further feature of the invention, the trunnion has an internal thread formed therein, and the pull-rod has an external thread meshing with each internal thread.

In accordance with an added feature of the invention, there is provided a guide bearing disposed between the extension of the trunnion ad the bearing hub in the bore of the latter. The axially fixed pressure plate of the second clutch is connected to the radially extending portion of the first housing part forming part of such pressure plate axially extending arms.

In accordance with an additional feature of the invention, the arms are pin-shaped axial extensions which integral with the axially fixed pressure plate of the second clutch, which extend through openings of the first diaphragm spring, and which are fastened to the first housing part for concentrically holding the first diaphragm spring.

In order to enable the flywheel body to run free of braking torques if the first body clutch is disengaged, there is provided a non-rotatable torsion-proof connection between the friction disc of the first clutch and the first shaft. Spring means are connected to a portion of such friction disc between the friction linings disposed thereon and the connection to the shaft to bias the friction disc away from the axially fixed pressure plate of the first clutch, and stop means is provided for limiting the axial movement of the friction linings of the friction disc of the first clutch.

In accordance with a further feature of the invention, the stop means limits the axial movement of the friction linings of the friction disc of the first clutch to at least substantially half the axial displaceability of the axially movable pressure plate of the first clutch.

A relatively simple construction of the friction disc of the first clutch can be obtained if, in accordance with an added feature of the invention, the friction plate includes a carrier which is axially displaceable relative to the spring means for the friction linings of the friction disc. The stop or travel-limiting means for the friction disc is then effective between the latter and the aforementioned spring means.

In accordance with a further feature of the invention, and in order to transmit torque between the freiction linings of the friction disc and the respective (first) shaft, the spring means are rigid in the direction of rotation and elastic in the axial direction. The spring means may be leaf springs, spider springs, diaphragms or the like and can serve to ensure lifting of the friction linings. An the one hand, the spring means are firmly to the first shaft and, on the other hand, such spring means support the friction surfaces provided concentrically to the first shaft. In accordance with an added feature of the invention, there are provided means, such as adjustable stops for adjusting the extent of limited axial travel of the friction linings of the friction disc of the first clutch.

In accordance with an additional feature of the invention, the stop means includes means acting between the friction linings and a part which is fixed to the first shaft, or the stop means can act between the friction linings and the means which are yieldable in the axial direction.

In accordance with a further feature of the invention, the adjustable stop means can constitute adjusting screws which meshing with one of the parts which are axially displaceable relative to each other and adapted to be brought to a halt against another of these parts. In accordance with an added feature of the invention, the screws are self-locking.

In accordance wth an additional feature of the invention, the stop means can be formed by plastic deformation such as by forming lugs, arms or the like on at one of the aforementioned parts, which are displaceable relative to each other in the axial direction.

It is particularly advantageous for the operation of the first clutch if, in the disengaged condition of the first clutch, the friction disc or the friction linings and the pressure plates of the first clutch are free of radial play. Therefore, in accordance with another feature of the invention, there are provided means for holding the friction linings of the friction disc of the first clutch against radial movement. This can be accomplished in a particularly simple manner by stop means which can be fastened to a carrier of the friction disc of the first clutch, for instance, by bolts, and the axial travel can be limited by the heads of such bolts.

The cup-shaped first housing part and the axially fixed pressure plate of the first clutch can be two discrete parts. In accordance with a further feature of the invention, the first housing part and the axially fixed pressure plate of the first clutch are form-fittingly fastened together in such a way that the connection is also effective in the circumferential direction. The form-locking connection can be realized by imparting to the axially fixed pressure plate a profile which is provided along its outer circumference and receives axially extending portions of the first housing part.

In accordance with an additional feature of the invention, the periphery of the axially fixed pressure plate of the first clutch and the first housing part are welded together.

In accordance with still another feature of the invention, there is provided a track disposed on one of the axially fixed parts, such as one of the pressure plates, and a starter motor having a friction wheel engageable with the track for accelerating the flywheel body to a given cranking-up speed in disengaged condition of the first and second clutches.

In accordance with a concomitant feature of the invention, the track is disposed on an axially extending portion of the first housing part.

Other features which are considered as characteristic of the invention are set forth in the appended claims.

The invention is not intended to be limited to the details shown, since various modifications and structural changes may be made therein without departing from the spirit of the invention and from the scope and range of equivalents of the claims.

The construction and mode of operation of the improved assembly together with additional features and advantages thereof will be best understood upon persual of the following description of certain specific embodiments when read in connection with the accompanying drawing.

BRIEF DESCRIPTION OF THE DRAWING

The single FIGURE of the drawing is a diagrammatic, fragmentary, partially axial sectional view of the novel friction clutch unit.

DESCRIPTION OF THE PREFERRED EMBODIMENTS

Referring now to the single FIGURE of the drawing, there is shown, in axial section, a flywheel body "S" which can be engaged with and disengaged from an internal combustion engine, especially the crankshaft "K" of an internal combustion engine, by a first clutch 1. The body "S" forms part of a second clutch 2.

The crankshaft "K" is fastened to a friction disc or carrier plate 3 which is provided with friction linings 4 and 5. A first pressure plate 6 is provided at that side of the disc 3 which faces the internal combustion engine, and a second pressure plate 7 is adjacent to the other side of the disc 3. The pressure plate 6 is connected by a basket-shaped housing part 8 which encloses and confines the friction disc and the pressure plate 7, with a radial flange 9 of a bearing hub 10. The pressure plate 6 is mounted on the hub 10 against movement in the axial direction but is rotatable in relation to the crankshaft "K".

The pressure plate 7 extends through the radial portions 12 of the basket-like housing part 8 with an axially extending projections 11 and is biased by a diaphragm spring 13 in a direction toward the friction linings 4, 5 of the friction disc 3 and the pressure plate 6. To this end, the radially outermost portion 13a of the spring 13 bears upon an axially fixed support 14 which constitutes the axially fixed pressure plate of the second clutch 2. The spring 13 is pivotable relative to the support 14 and its intermediate portion 13b abuts against the projections 11.

The pressure plate 14 of the second clutch 2 is provided with axially directed post or pin-shaped bosses or extensions 15 which extend through openings 16 of the spring 13. The bosses 15 ensure that the spring 13 remains concentric with the pressure plates 6 and 7. Furthermore, the pressure plate 14 is secured to the housing part 8 by screws 17.

The pressure plate 7 of the first clutch 1 is connected with the basket-like housing part 8 by torque transmitting means in the form of leaf springs 18. The connection is rigid, as considered in the direction of rotation, but the pressure plate 7 is movable in the axial direction. The leaf springs 18 are disposed between the pressure plate 7 and the portion 12 of the basket-shaped housing part 8. The first end portion of the springs 18 are fastened to the radially inward extending portion 19 of the pressure plate 7 and the second end portions of the springs 18 are secured to the portion regions 12 of the housing part 8. The springs 18 are prestressed in such a manner that the pressure plate 7 moves away from the pressure plate 6 and thus remains in contact with the spring 13 when the load is removed from the spring 13. It is advantageous to secure the leaf springs 18 to the radial portion 12 of the basket-shaped housing 8 by the screws 17 which secure the pressure plate 14 of the second clutch 2 to the portion 12.

The housing part 8 and the pressure plate 6 are connected to each other against relative movement in the axial and also in the circumferential direction by a form-fit or clamping 20 or by a welded joint which is not shown. A form fitting connection is one established by the complementary shapes of the parts themselves. The housing part 8 is provided with a shoulder 21 against which the pressure plate 6 is clamped by bending of the radially extending portions 22 of the housing part. In this way, the portions 22 extend into the profiles 23 which are provided at the periphery of the pressure plate 6 to prevent rotation of the parts 6 and 8 relative to each other.

A pull-rod 24 is provided for disengaging the clutch 1. The pull-rod 24 is connected with a disc-shaped throw-out or disengagement plate 25 whose marginal portion 26 engages at the radially innermost portion 13c of the spring 13. When the pull-rod 24 is moved to the right, as seen in the drawing, the spring 13 pivots relative to a collar 14a of the pressure plate 14. This enables the pressure plate 7 to move to the right.

To engage the clutch 1, the pull-rod 24 is moved in a direction to the left, as viewed in the drawing, so that the spring 13 moves the pressure plate 7 to the left, whereby the disc 3 is again clamped between the pressure 6 and 7.

The pressure plate 14 of the second clutch 2 has a friction lining 14′ for the friction disc 27 of the clutch 2 whose housing or cover 28 is screwed to a portion of the axially fixed pressure plate 14. The second friction lining for the disc 27 is provided on a pressure plate 29 which is biased by a diaphragm spring 30 in a conventional manner. The disc 27 is mounted on a hollow transmission shaft which is held against radial movement but is free to move axially. When the clutch 2 is engaged, the disc 27 is clamped between the first and second pressure plates 14 and 29 in a conventional manner. The clutch 2 is disengaged by moving the radially innermost portion of the spring 30 in a direction to the left, i.e., counter to the direction of movement of the pull-rod 24 to disengage the clutch 1.

The throw-out plate 25 has a flange 31 which is provided with a trunnion or post 32. The internal thread 33 for the pull-rod 24 is provided in the trunnion 32 and an axial protrusion 35 of the trunnion is received of a bore 36 in the bearing hub 10 to guide the plate 25 during axial movement and to prevent its movement in the radial direction. Furthermore, in order to enhance the slidability of the plate 25, a guide bushing 37 is provided between the protrusion 35 of the trunnion 32 and the surface surrounding the bore 36 in the bearing hub 10.

Aligned apertures 38 and 39 are provided in the throw-out plate 25 and in the radial flange 9 of the bearing hub 10 which latter enables the flywheel body "S" to rotate with respect to the crankshaft "K". Holding screws 40 which connect the rotatable crankshaft "K" with the disc 3 and bearing parts 41 are accessible through the apertures 38, 39.

The disc 3 of the clutch 1 is connected with the crankshaft "K" by a membrane or diaphragm 42 in such a manner that it is held against rotation, relative to the crankshaft but is axially movable with respect thereto. For this purpose, a carrier 43 of the disc 3 for the friction linings 4 and 5 is connected to the crankshaft "K" by the membrane 42. The spring action of the membrane 42 is away from the pressure plate 6 and the spring motion or path thereof is limited in the axial direction by stop means 44 in such a manner that the extent of axial movement of the friction linings 4, 5 is at least approximately half the extent of movement of the movable pressure plate 7.

The stop means 44 is constituted by screws 45 which are provided with heads 46 for limiting the extent of axial movement of the membrane. The threaded portions 47 of the screws 45 extend through the elastic membrane 42 and are adjustably connected with the carrier 43 by nuts 48. It is desirable to distribute the screws 45 uniformly, as considered in the circumferential direction of the disc 3, so that in addition to limiting the extent of axial movement of the membrane 42, the radial play or freedom of lateral movement of the disc 3 can be easily adjusted.

In the example shown in the drawing, the stop means 44 operates between the axially elastic membrane 42 and the carrier 43. However, such stop means, can also act between a part which is fixed to the crankshaft "K" and the friction linings 4, 5 or the carrier 43, or the membrane. Furthermore, the stop means 44 can be provided as a result of plastic deformation, such as for instance by bending a lug or the like out of one of the parts which can be axially moved relative to each other. The lug comes to a halt against another of these parts. Also, the stop means may comprise rivets.

The pull-rod 24 which is provided to disengage the clutch 1 is connected to the flange 31 of the throw-out plate 25. The connection between the flange 31 and the pull-rod 24 is effected by a bayonet-type lock 53. The lock 53 establishes between such parts a positive locking action as considered in the circumferential direction, as well as in the direction of pull after the pull-rod 24 has been introduced into the throw-out plate 25 and has been rotated relative to the flange 31.

The housing part 8 of the first clutch 1 has a track 49 for a friction wheel 50 having a conical peripheral surface 50a. The friction wheel is mounted on a starter motor 51 which is only schematically indicated. The motor 51 is preferably a worm-drive starter whose axis 52 makes an acute angle with the axis of rotation of the clutch assembly.

In order to start internal combustion engine, the clutch 1 is disengaged, and possibly also the clutch 2 if the transmission is not in the neutral position. It is assumed that the disengagement of the two clutches 1 and 2 is effected automatically, for example, by pressure controlled means in response to turning of the ignition key. After the two clutches are disengaged, the starter motor 51 is set in motion and the friction wheel 50 is moved in the direction of the arrow 50b until its surface 50 contacts the track 49 and thereby accelerates the clutch unit to a predetermined number of revolutions. The engine is started by engaging the clutch 1. By operating the clutch 2, the vehicle can then be operated in the known manner.

When the wheels drive the engine, i.e., when the car is coasting (during a so-called push-operation) or, for example, during short stop because of traffic, the clutch 1 can be disengaged and the internal combustion engine can either continue to run at a reduced number of revolutions or be turned off altogether. Since the clutch 2 is then also disengaged, the flywheel can continue to turn and when the number of revolutions drops below a predetermined value, the flywheel can be accelerated to rotate at a higher speed. This can be done by the starter motor 51 and the friction wheel 50 or by the engine itself, namely, by engaging the clutch 1 when the number of revolutions of the flywheel has fallen below the aforementioned value. The engine is started for a interval of time until the flywheel has reached the predetermined number of revolutions again, and the clutch 1 is again disengaged and the engine is shut off. When the need for power output of the engine exists again, the clutch 1 is engaged again, and the internal combustion engine is started.

We claim:

1. A friction clutch assembly, comprising a first shaft, such as the crankshaft of an internal combustion engine; a bearing system having a hub rotatable relative to said first shaft; a first clutch including a flywheel body rotatably supported by said bearing system and being operable to engage said flywheel body with and to disengage said flywheel body from said first shaft, said first clutch comprising first and second pressure plates forming part of said flywheel body, a first friction disc between said pressure plates and having first and second friction linings facing the respective pressure plates, means for non-rotatably connecting said friction disc to said first shaft, means for securing said first pressure plate to said bearing system, said second pressure plate being rotatable with and movable axially relative to said first pressure plate, means for urging said second pressure plate away from said friction disc, a first housing part having a radially inwardly extending portion secured to said hub, and a first diaphragm spring arranged to bias said second pressure plate against the respective friction lining; a second shaft, such as the transmission shaft of a motor vehicle; and a second clutch forming part of said flywheel body and operable to engage said flywheel body with or to disengage said flywheel body from said second shaft, said second clutch comprising an axially fixed first pressure plate, axially extending arms connecting such first pressure plate to said portion of said first housing part, an axially movable second pressure plate, a second friction disc disposed between the pressure plates of said second clutch and secured to said second shaft, a second housing part secured to the first pressure plate of said second clutch, and a second diaphragm spring mounted in said second housing part, the following components of said first and second clutches being adjacent to each other, as considered in the axial direction of said first shaft: (a) the first pressure plate of said first clutch, (b) said first friction disc, (c) the second pressure plate of said first clutch, (d) said portion of said first housing part, (e) said first diaphragm spring, (f) the first pressure plate of said second clutch, (g) said second friction disc, (h) the second pressure plate of said second clutch and (i) said second diaphragm spring.

2. The assembly of claim 1, wherein the first pressure plate of said first clutch is further secured to said portion of said first housing part and the latter confines the second pressure plate of said first clutch and said first friction disc, the second pressure plate of said first clutch having arms extending axially through said portion of said first housing part and a predetermined portion of said first diaphragm spring bearing against said arms.

3. The assembly of claim 2, wherein said first diaphragm spring reacts against the first pressure plate of said second clutch at a location disposed radially outwardly of said predetermined portion.

4. The assembly of claim 2, wherein said urging means comprises resilient means axially movably but non-rotatably fastening the second pressure plate of said first clutch to said first housing part.

5. The assembly of claim 3, wherein said fastening means is disposed between said first housing part and the second pressure plate of said first clutch.

6. The assembly of claim 1, further comprising operating means for said first clutch, said operating means including an axially movable pull-rod coaxial with said first shaft and a throw-out plate provided on said pull-rod, said first diaphragm spring having a portion movable by said throw-out plate.

7. The assembly of claim 6, wherein said hub includes a radial flange, said flange having apertures and said connecting means including fasteners securing said first friction plate and a part of said bearing system to said first shaft, said fasteners being accessible by way of said apertures.

8. The assembly of claim 7, wherein said throw-out plate has apertures which are at least substantially aligned with the apertures of said flange.

9. The assembly of claim 6, further comprising bayonet lock means for coupling said throw-out plate to said pull-rod.

10. The assembly of claim 6, further comprising a trunnion coaxial and movable with said throw-out plate, said trunnion having an extension and said hub having a bore slidably receiving said extension to limit said throw-out plate to movement axially of said first shaft.

11. The assembly of claim 10, wherein said trunnion has an internal thread and said pull-rod has an external thread meshing with said internal thread.

12. The assembly of claim 10, further comprising a guide bearing provided in said bore and slidably receiving said extension.

13. The assembly of claim 1, wherein said axially extending arms are pin-shaped extensions of the first pressure plate of said second clutch and said first diaphragm spring has openings for such extensions, and further comprising means for fastening said extensions to said portion of said first housing part.

14. The assembly of claim 1, wherein said first housing part and the first pressure plate of said first clutch are form-fittingly fastened to each other.

15. The assembly of claim 14, wherein the first pressure plate of said first clutch has a circumferential profile and said first housing part has axially extending portions extending into said profile.

16. The assembly of claim 1, wherein the first pressure plate of said first clutch is welded to said first housing part.

17. The assembly of claim 1, further comprising spring means connected to said first friction plate between said linings thereof and said connecting means and arranged to bias said first friction disc away from the first pressure plate of said first clutch, and stop means for limiting the extent of axial movement of said first friction disc.

18. The assembly of claim 17, wherein said spring means is rigid as considered in the circumferential direction and resilient as considered in the axial direction of said flywheel body, said spring means having a first end fastened to said first shaft and a second end supporting said first friction disc coaxially with said first shaft.

19. The assembly of claim 17, further comprising means for adjusting the extent of axial movement of said first friction disc.

20. The assembly of claim 17, wherein said spring means is secured to said first shaft and said stop means is operative between said spring means and said first friction disc.

21. The assembly of claim 17, wherein said spring means is resilient as considered in the axial direction of said first shaft and said stop means is operative between said spring means and said first friction disc.

22. The assembly of claim 17, wherein said first friction disc includes a carrier for the respective linings, said carrier being movable relative to said spring means in the axial direction of said first shaft and said stop means including screws adjustable secured to said carrier and arranged to be arrested by said spring means.

23. The assembly of claim 22, wherein said screws are self-locking.

24. The assembly of claim 17, wherein said stop means are in the form of plastic deformations.

25. The assembly of claim 17, wherein said stop means is arranged to limit the extent of axial movement of said first friction disc to at least substantially half the axial movability of the second pressure plate of said first clutch.

26. The assembly of claim 17, further comprising means for holding said first friction disc against radial movement while said stop means limits the extent of axial movement of said first friction disc.

27. The assembly of claim 1, wherein one of the components including said housing parts and said first pressure plates has a track and further comprising motor means having a friction wheel engageable with said track to accelerate said flywheel body to a predetermined cranking-up speed in disengaged condition of said clutches.

28. The assembly of claim 27, wherein said track is provided on said first housing part.

* * * * *